Feb. 5, 1957  B. E. LUBOSHEZ  2,780,141
PRISM MAGNIFICATION SYSTEM HAVING CORRECTION
MEANS FOR UNILATERAL COLOR
Filed March 31, 1955  3 Sheets-Sheet 1
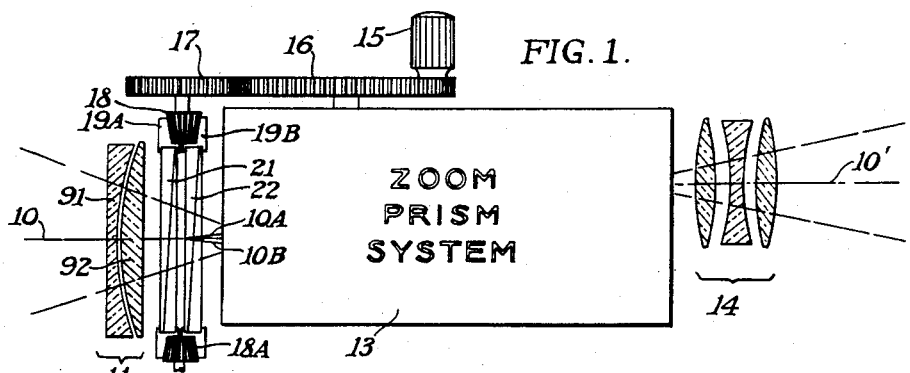
FIG. 1.
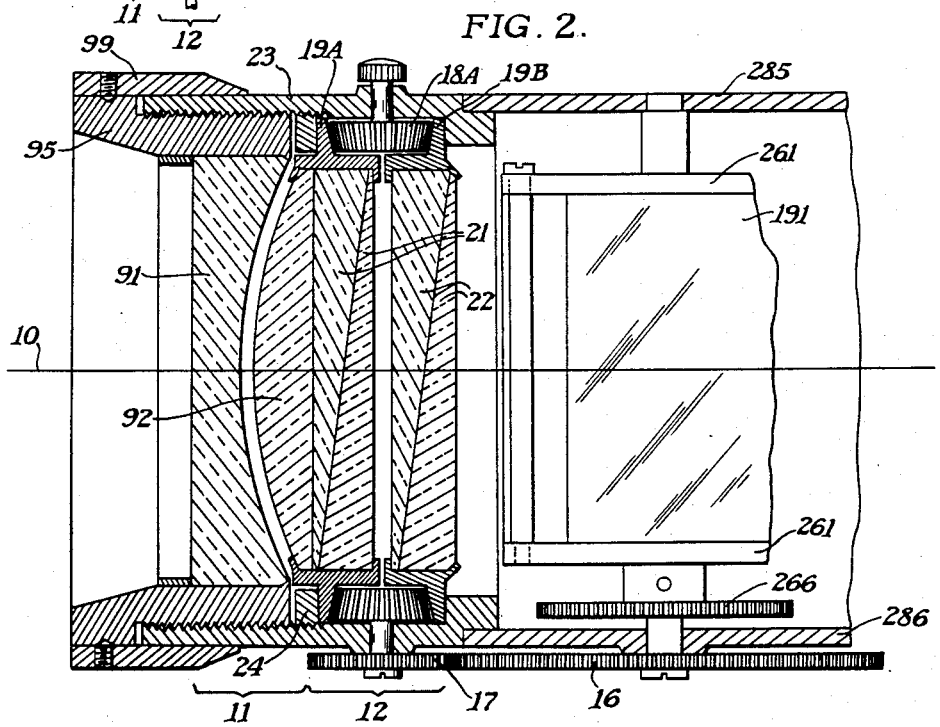
FIG. 2.
FIG. 3. FIG. 4.
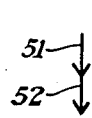
FIG. 5.
BENJAMIN E. LUBOSHEZ
INVENTOR.
BY Daniel I. Mayne
Harold F. Bennett
ATTORNEY & AGENT

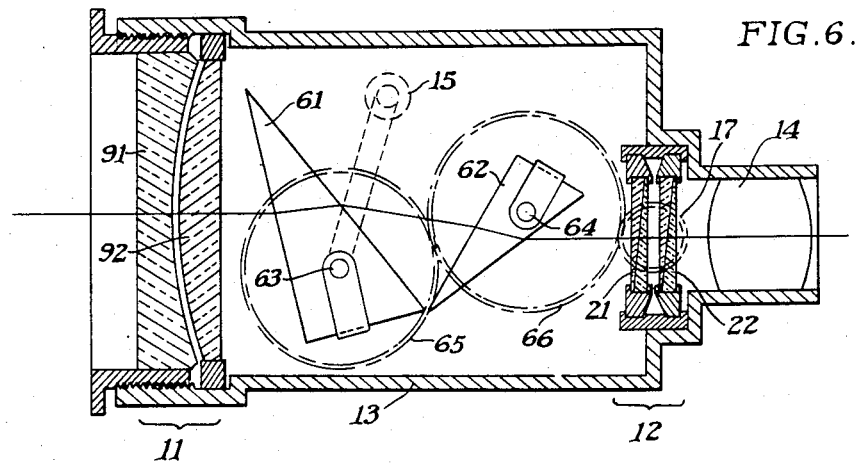
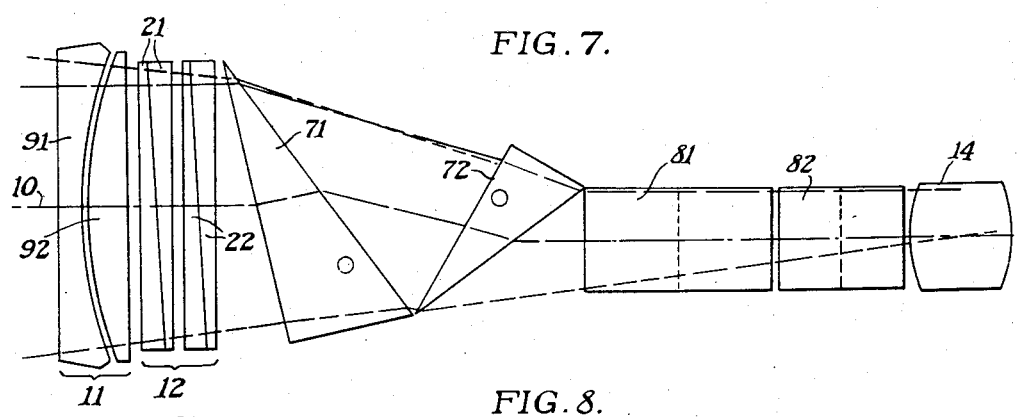
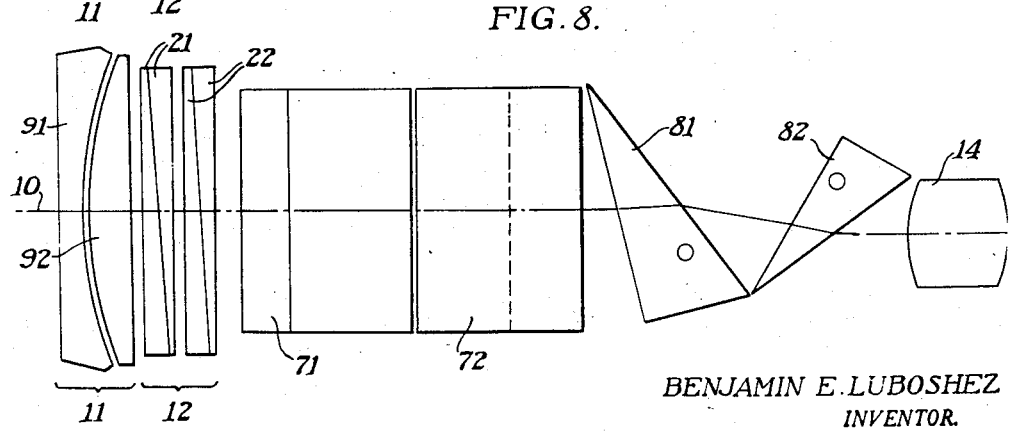

Feb. 5, 1957 B. E. LUBOSHEZ 2,780,141
PRISM MAGNIFICATION SYSTEM HAVING CORRECTION
MEANS FOR UNILATERAL COLOR
Filed March 31, 1955 3 Sheets-Sheet 3
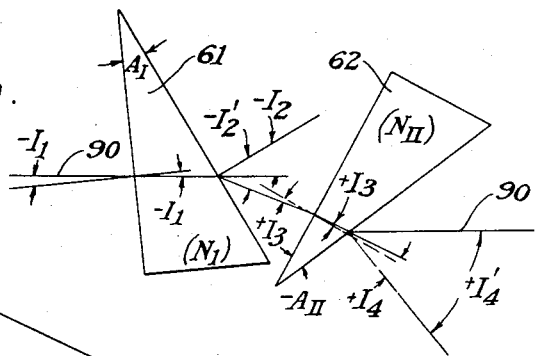
FIG. 9.
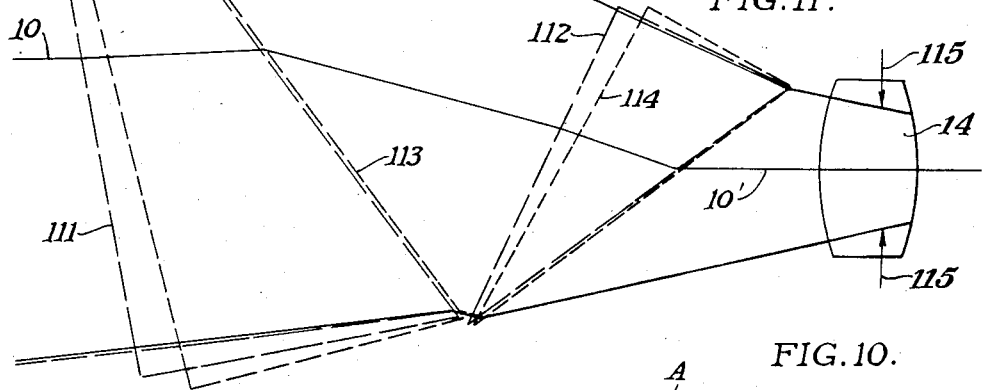
FIG. 11.
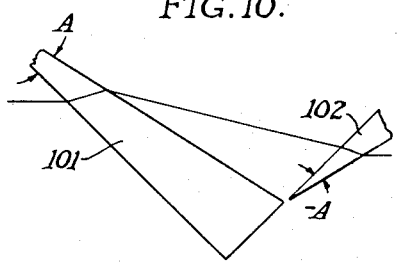
FIG. 10.
FIG. 12.
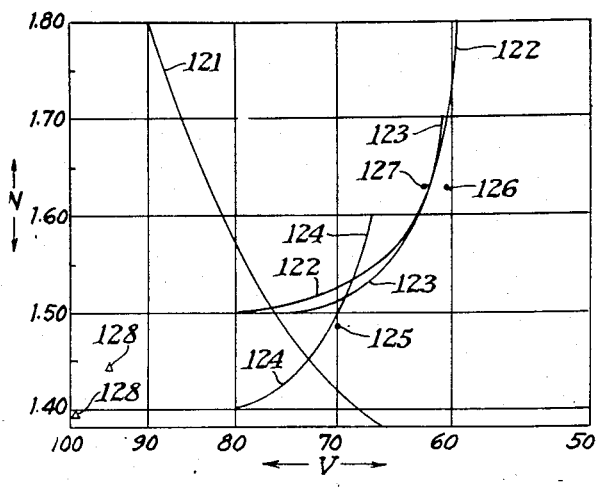
BENJAMIN E. LUBOSHEZ
INVENTOR.
BY Daniel J. Mayne
Harold F. Bennett
ATTORNEY & AGENT United States Patent Office 2,780,141
Patented Feb. 5, 1957

2,780,141

PRISM MAGNIFICATION SYSTEM HAVING CORRECTION MEANS FOR UNILATERAL COLOR

Benjamin E. Luboshez, Rochester, N. Y., assignor to Eastman Kodak Company, Rochester, N. Y., a corporation of New Jersey Application March 31, 1955, Serial No. 498,168

3 Claims. (Cl. 88—57)

This invention relates to prism anamorphosers and telescopic systems made up of two such anamorphosers with their active planes at right angles to each other and particularly to such systems in which the prisms are rotated in their active planes for varying the magnification. In the following specification and claims the term "zoom prism system" will be used to include both anamorphotic and telescopic prism systems of this variable type.

Primarily, the invention relates to such zoom prism systems in which the individual prisms are not achromatized but is not limited thereto.

The object of the invention is correct the unilateral color of a zoom prism system.

An ancillary object of the invention is to provide a device for producing a controllable amount of unilateral color.

A further object of the invention is to provide means for controlling such a device so as to produce unilateral color of opposite sign to that of a zoom prism system and approximating it in amount within predetermined acceptable tolerances at all stages of the zooming.

An object of a special feature of the invention is to provide zoom prism systems in which the unilateral color is reduced without using compound prisms.

Prisms anamorphosers have long been known. A prism anamorphoser comprises two refracting prisms with their refracting edges parallel and on opposite sides of the path of a ray of light traversing the two prisms, and may comprise more than two prisms including at least one in each orientation. The plane perpendicular to the refracting edges is called the "active plane," and an object viewed through the prisms is stretched or compressed in the direction of the active plane according as the prisms are on one side or the other of the position of minimum deviation. There is no magnification in the transverse direction, however. Usually the path of one ray can be found which is not angularly deviated by the anamorphoser, and this ray path is designated as the axis of the anamorphoser. A system in which the anamorphoser is axially aligned with other optical elements such as lenses is called a "straight vision" system. Although this ray path is not deviated for light of a median color, such as the "D" solar line, a little deviation generally occurs in other colors, thus spreading the original white ray out into a tiny spectral fan. This unequal deviation of different colors, particularly at the axis, is called "unilateral color." Anamorphosers have been highly developed, particularly in the direction of achromatizing the individual prisms to correct the unilateral color. The present invention provides a more efficient method of correcting unilateral color than by achromatizing each prism.

Over a century ago Brewster and Amici independently invented the prism telescope system made up of two anamorphosers, one acting in the vertical plane and one in the horizontal plane. However, these telescopes remained just a scientific curiosity until my invention described in my copending application, "Prism Lens Systems of Fixed and Variable Focal Length," Serial No. 453,092, filed August 30, 1954, in which I combine a prism telescope with an objective lens for increasing and decreasing the focal length of the latter, i. e. for zooming. Reference is made to this copending application for a description of zoom prism systems and for the theory of prism magnification.

Another type of zoom prism system unknown in the prior art is described in my copending application, Serial No. 531,884, "Prism Magnification Systems Comprising Three or More Prisms," filed September 1, 1955. It consists of three prisms (or pairs of prisms) oriented at approximately 120° apart around the axis or six prisms at approximately 60° apart. I say "approximately" or "substantially" because careful computation shows that the orientation should differ up to 3° or 4° from the exact 60° or 120° angle to give an undistorted image.

Any of the zoom prism systems, then, can be described as comprising a plurality of deviating prisms with their active planes optically aligned with the axis and oriented at substantially equal angles around the axis, since the anamorphoser type comprises two (or three) prisms at 180° intervals and the telescope system comprises four prisms at 90° intervals around the axis. The present invention is also applicable to five-prism systems with planes at substantially 72° apart, but systems with more than four prisms have little commercial significance, possibly excepting the six-prism system.

According to the invention, the above objects are accomplished by combining an objective, a zoom prism system as above defined and a pair of color dispersion wedges rotating in opposite directions in planes transverse to the optic axis of the whole system.

The resultant direction of the dispersion (unilateral color) of the wedges is opposite to that of the residual dispersion of the zoom prism system and the amounts of these two dispersions are maintained approximately equal (i. e. within tolerance limits) by rotating the wedges while zooming.

The objective is preferably focused on infinity and a collimator is placed in front of the wedges and prisms so that the wedges and prisms operate in approximately collimated light.

In the accompanying drawings:

Fig. 1 shows a prismatic zoom optical system according to the invention.

Fig. 2 shows in more detail the dispersion wedges according to the invention and adjacent parts of the system.

Figs. 3, 4 and 5 are vector diagrams for explaining the operation of the dispersion wedges.

Fig. 6 is a diagrammatic axial section of a form of the invention in which the dispersion wedges are behind the zoom prism system.

Figs. 7 and 8 are diagrammatic sections in elevation and plan of the optical elements of a zoom system according to the invention.

Fig. 9 is an optical diagram for explaining the theory of the invention.

Fig. 10 is a variation of Fig. 9.

Fig. 11 is a diagram comparing two anamorphoser systems made of glasses of different refractive indices.

Fig. 12 is a diagram illustrating the interrelationship of refractive index and dispersive index in the glasses used in the zoom prism systems.

Fig. 1 shows a prismatic zoom optical system according to the invention, comprising, from front to rear, a focusing lens 11, a pair of dispersion wedges 12 according to the invention, a zoom prism system 13 having unilateral color aberration greater than a predetermined tolerance, and an objective lens 14, all aligned upon an optical axis 10—10', which generally is laterally displaced by the zoom prism system 13.

The focusing lens 11 is of known structure and is adjusted by moving the front lens element so as to collimate the light rays from a selected object point.

The pair of dispersion wedges 12 are shown in greater detail in Fig. 2 and described in connection therewith. Each of the two dispersion wedges consists of a wedge of low dispersion or crown glass and an opposed wedge of high dispersion or flint glass shown in diagrammatic cross section in their active plane. These dispersion wedges deviate light of different colors differently so that the ray along the axis 10 is spread out into a little spectral fan of rays from 10A to 10B. The constants of the individual wedges are chosen so that the unilateral color of the dispersion wedges (as measured by the angle between 10A and 10B) is in the same plane as that of the zoom prism system, is opposite in sign, and differs numerically therefrom by less than a predetermined tolerance. Preferably the wedge constants are also chosen so that light of a median color proceeds undeviated.

The zoom prism system 13 may be constructed according to the prior art or according to my copending application No. 453,092, mentioned above but preferably comprises prisms of different dispersions according to the rule given below in Eq. 12. As described above, it comprises a plurality of deviating prisms with their active planes oriented at substantially equal angular intervals around the axis. A crank 15 is provided for zooming the prism system, and a gear wheel 16 is provided for purposes of adjusting the dispersion wedges. The gear wheel 16 meshes with a pinion 17 keyed to a bevel pinion 18 which turns the bevel gears 19A, 19B thus rotating the dispersion wedges 21, 22 in opposite directions when the crank is turned for changing the net unilateral color of the dispersion wedges at approximately the same rate as that of the prism zoom system.

Fig. 2 shows in greater detail the color dispersion wedge device which is the heart of the invention. It is shown mounted on the front end of a 4-prism telescope system such as that shown in Fig. 26 of my earlier application except that the prisms may be simple prism elements rather than achromatized doublets. The right-hand part of the figure shows the front end of the zoom prism system including the front prism 191 mounted between two metal plates 261 and rotated by the gear wheel 266 which is turned by a hand crank working through a rack and pinion as shown in full in the earlier application. These parts are numbered the same as in the earlier application and are shown in plan view. The prism axis is journaled in the two sides of the housing 285—286 shown in section. In the left-hand part of Fig. 2 are shown the focusing lens 11 and the variable dispersion device 12 in cross-section in a manner corresponding to Fig. 27 of my earlier application. The lens barrel 23 is cylindrical in the portions surrounding the optical elements and is square at the back end to fit onto the front of the square housing of the zoom prism system. The two dispersion wedges 21, 22 are mounted in rings formed by the two bevel gears 19A, 19B, which rotate in the barrel 23 against a shoulder on the one hand and a retaining ring 24 on the other hand. Optionally, the two rings are held apart by a spring not shown between the adjacent faces thereof. A bevel pinion 18 and optionally an idler pinion 18A are mounted on short shafts journaled in the lens barrel and mesh with the bevel gears 19A and 19B to rotate them in opposite directions. The bevel gear 18 is driven by a pinion 17 which in turn is driven by the gear wheel 16 which is shown as an integral part of the crank in Fig. 1 but is mounted on a separate shaft from the crank in Fig. 2. It is to be understood that the dispersion wedges 21, 22 in Figs. 1 and 2 are sectioned on their active plane at maximum dispersion (unilateral color) and that this plane is not necessarily the horizontal plane corresponding to the view given. The orientation of this active plane of the dispersion wedges depends, of course, upon the type of zoom prism system it is used with and more specifically upon the direction of the maximum unilateral color of the prism system. In the 4-prism telescope system such as shown in part in Fig. 2, the maximum unilateral color will be in a 45-degree diagonal direction.

The focusing lens comprises a negative element 91 and a positive element 92. The positive element is mounted in a fixed position so far as axial movement is concerned. Optionally, it may be cemented onto the front of the dispersion wedge 21 for convenience in mounting, in which case it rotates around the axis along with the dispersion wedge, but this rotation does not have any optical effect so long as the element is maintained centered upon the optical axis. The negative element 91 is mounted in a ring 95 which is threaded to turn in the threaded portion of the barrel 23 for moving the element 91 in an axial direction for focusing as is well known in the prior art and as described in my earlier application. A focusing scale is engraved or otherwise marked on the outer ring 99 to aid in focusing.

Figs. 3, 4 and 5 are vector diagrams showing how the pair of dispersion wedges operates to change the unilateral color in the active plane. In Fig. 3 the dispersion or unilateral color of the first dispersion wedge 21 is represented dispersion varies from +2 to −2 times the dispersion wedge 22 is represented by a second arrow 52. Assuming that the front element of each wedge is made up of low-dispersion glass and the rear element of high-dispersion glass, blue light is bent downward more than red light and this is indicated by the downward direction of the arrows 51, 52. The total dispersion or unilateral color of the two dispersion wedges is then equal to twice that of one of them. Fig. 4 represents the effect of rotating each of the wedges 90 degrees in opposite directions. In this case, the arrow 51 points in one horizontal direction and the other arrow 52 points in the opposite direction, indicating that the two dispersions cancel each other out, leaving a resultant of zero dispersion for the two wedges.

Fig. 5 shows the more general case in which each dispersion wedge has been rotated through an angle T from the vertical. In this case the vectors 51 and 52 give a resultant dispersion in the vertical direction represented by the arrow 53 and equal to cos T times the sum of the two individual dispersions. As the cosine varies from +1 to −1, while T is varied from 0° to 180°, the resultant dispersion varies from +2 to −2 times the dispersion of one of the dispersion wedges. It is to be noted that the position of the wedges shown in Fig 2 is not necessarily that at which the angle T is equal to zero, and it is also to be noted that the arrow 53 of Fig. 5 which is shown pointing toward the vertical is not necessarily vertical in all cases but is assumed to be pointing in the direction of the maximum unilateral color of the zoom prism system. In two-prism anamorphosers, this is horizontal or vertical, while in 4-prism telescopic systems, it is at the 45° orientation with respect to the main prism system.

In other systems the dispersions of the two dispersion wedges are not necessarily equal. For example, it may be desirable to construct a zoom system which maintains a constant percentage of anamorphosis, while changing the magnification, that is zooming the over-all size of the image. This is done either by adding a fixed 2-prism anamorphoser in front of a zoom telescopic system or by zooming a 4-prism system so that one pair of prisms operates, for example, from 1.6 to 0.8 magnification while the other operates from 1.25 to 0.625 magnification. Furthermore, in the 3 and 6-prism systems, the unilateral color of the zoom prism system is not in all cases confined to a single plane. The designer has the following variables at his command in designing the pair of dispersion wedges: The dispersion of the first wedge, the dispersion of the second wedge, the rate of rotation of the first wedge, and the rate of rotation of the second wedge which may differ from that of the first wedge, and each wedge may be made to rotate less than 180° for the purpose of getting the best match to the unilateral color of the prism system throughout the zooming range.

Fig. 6 is a diagrammatic section of a variable anamorphoser with corrected unilateral color according to the invention. In this case the dispersion wedges 21, 22 are behind the deviation prisms 61, 62 rather than in front of them as previously shown. The dispersion wedges may be located in front of or behind the zoom prism system as may be found more convenient in particular cases. The focusing lens comprising elements 91, 92 operates as previously described. Light from a distant object at the left traverses the focusing lenses and then is deviated downward by the prism 61 and deviated back to the horizontal direction by the prism 62, the image being stretched in the vertical plane (the plane of the diagram) thereby. The prisms 61, 62 being unachromatized, however, the image is afflicted with unilateral color in the vertical plane. The constants of the dispersion wedges 21, 22 are chosen so as to bring rays of two selected wave lengths back into parallelism as they strike the objective 14, which focuses them upon a focal plane, not shown. The prisms are mounted to turn upon the axes 63, 64 when the crank 15 is turned and gear wheels 65, 66 on the respective axes turn both prisms simultaneously. The latter gear wheel 66 meshes with a pinion 17 for rotating the wedges in opposite directions in the manner previously described. The two gears 65 and 66 are normally but not necessarily of the same size, and the gear ratio of pinion 17 thereto determines the angular movement of the dispersion wedges when the system is zoomed.

According to a special feature of my invention, the dispersion of the rear prism 62 is greater than that of the front prism 61 approximately in the ratio of $$\frac{M^2 + \frac{1}{M}}{M+1}$$

where M is the magnification per prism at one end of the zooming range.

By way of example, prisms 61 and 62 can be made of Schott glasses PK-1 and K-6, in which $N_D=1.50371$ and 1.50268 and $V=66.7$ and 60.6 respectively for a zooming range of 1.90 to 0.525 anamorphic magnification. I find refracting angles of 23.0° and 23.1° convenient for giving the two prisms the same angular rotation between the two extreme positions. The aspect angles $\phi_1$ and $\phi_3$, defined in my earlier application, vary from about $-140°$ and $+31°$ in the position of maximum magnification as shown to about $+53°$ and $-36°$ at the other extreme. A pair of prisms in the example described with reference to Figs. 7 and 8 can also be used in this system if reversed in order.

As pointed out in my earlier application, linearly related angular movements of the two prisms 61, 62 give a close approximation to a straight-vision system throughout the zooming range. If a closer approximation is desired, however, elliptical gears or some kind of cam arrangement can be used in known manner.

Although only a 2-prism anamorphoser system is shown in the drawings with the dispersion wedges mounted behind it, it may be noted that the positioning of the dispersion wedges in front of or behind any type of zoom prism system is optional although the amount of dispersion required in the wedges may not be the same in one position as it is in the other. In the form in which the dispersion wedges are mounted in front of the zoom prism system, the wedges are larger and thicker than in the form in which they are mounted behind the zoom system. However, the prisms of the zoom prism system are smaller in the former case and must be larger in the latter case. Careful design is required to determine which system is the shortest over-all, and the final decision as to the positioning of the dispersion wedges should take into account such factors as the convenience of mounting the bevel gears and other optical and mechanical parts.

Figs. 7 and 8 are optical diagrams in elevation and plan respectively of a prismatic zoom optical system according to the invention in which the zoom prism system is a 4-prism telescopic zoom system of the type described in great detail in my earlier application.

Briefly, light from a more or less distant object to the left is collimated by the focusing lenses 91, 92 as above described. The collimated rays then proceed through the two dispersion wedges 21, 22 which introduce unilateral color in a 45-degree direction and then through the first pair of prisms 71, 72 shown in the position of maximum magnification. This pair of prisms magnifies the image in the vertical plane and has unilateral color equal and opposite to the vertical component of the unilateral color of the dispersion wedges 21, 22. These prisms also displace the axis downward but preferably are so designed as to produce very little, if any, angular deviation of the axis. The light then proceeds through the second pair of prisms, 81, 82 which magnify the image in the horizontal direction, displace the axis slightly to the left (that is, toward the bottom of the diagram), and contribute unilateral color equal and opposite to the horizontal component of the unilateral color of the dispersion wedges 21, 22.

The light proceeds from the glass prism 82 to the objective 14 which is focused on infinity and which brings the rays to a focus on a focal plane, not shown, in the customary manner.

As an illustrative example, the system shown in Figs. 7 and 8 can have the following optical characteristics: Element 91 is negative and element 92 is positive of substantially equal focal length $f=SL$ where S is the amount of movement of the front element 91 permitted or selected as convenient in focusing and L is the near object distance to be focused upon. For example, if a movement of 1.44 cm. is selected to focus from infinity down to a near object distance of 100 cm., then the focal length of each element 91, 92 is numerically equal to $\sqrt{144}$ or 12 cm. The wedge angle of the dispersion wedges 21, 22 is determined by the optical characteristics of the prism system and accordingly, the specifications of the prism system will be given first.

The prisms are defined by the apex angle A, which is considered negative in the second and fourth prisms 72, 82, and by the slope $\varphi$ of the front surface of each prism. This angle $\varphi$ is the same in sign and magnitude as the angle of incidence upon the specified surface of a ray parallel to the axis of the objective lens 14. The characteristics of the prism system are as set forth in the following Tables 1 and 2:

TABLE 1

|  | First Prism Schott K-11 | Second Prism Schott FK-5 |
|---|---|---|
| $N_D$ | 1.50005 | 1.48742 |
| $N_F-N_C$ | .00812 | .00696 |
| V | 61.6 | 70.0 |
| A | 22.862° | −23.357° |

TABLE 2

|  | First Position | Second Position |
|---|---|---|
| $\phi_1$ | −14.197° | +54.903° |
| $\phi_3$ | +30.543° | −38.557° |
| $M_I$ | 1.3877 | .7002 |
| $M_{II}$ | 1.3989 | .6981 |
| M | 1.9412 | .4889 |
| $dI_{II}*$ | −.00340 | −.00491 |
| $dI_{II}*/M_I$ | −.00245 | −.00702 |
| $dI_{I}*$ | +.00385 | +.00558 |
| $dI*$ | +.00140 | −.00144 |
| $dI*\sqrt{2}$ | +.00198 | .00204 |

Table 1 gives glass data and the refracting angle A of the respective prisms. The prism angles were chosen relative to each other to give equal angular rotations of the two prisms from the first position to the second position, both equal to 69.10°. Any ratio of the angular rotations within reason can be chosen and the system designed accordingly by assigning a larger angle A to a prism which is to rotate through a smaller angle of rotation.

According to a special feature of the invention, the dispersive indices are chosen different from each other approximately in the ratio specified above in order to equalize and thereby minimize the unilateral color of the prism system at the two extreme positions.

Table 2 gives data of the prism system at the two extreme positions. These positions are chosen to give a straight-vision system within .01°. The postions of the prisms are defined by the angles $\phi_1$ and $\phi_3$ defined above. The magnifications $M_I$ and $M_{II}$ of the first prism and the second prism respectively and the combined magnification M of the two prisms relate to the axial ray from left to right in Figs. 7 and 8.

The asterisks (*) are intended to indicate that the unilateral color data all relates to an axial ray from right to left, since it is this aberration which is to be corrected by the dispersion wedges 21, 22. The unilateral color of the individual prisms is indicated by $dI_I*$ and $dI_{II}*$, and that of a two prism anamorphoser (either prisms 71 and 72 or 81 and 82) is found by the formula $$dI* = dI_I* + dI_{II}*/M_I$$

which is Eq. 11 below adapted in an obvious way to the reversed ray. The unilateral color in the 45° direction of the whole four-prism system is given as $dI*\sqrt{2}$. The values here are from the approximate formulas given below and are perhaps 1% smaller than the exact values would be.

The total range of magnification is 3.97. Combined with a 100 mm. objective the system would zoom from 48.9 mm. to 194 mm. focal length.

Optionally the unilateral color can be fully corrected by the dispersion wedges or it can be corrected within a predetermined tolerance.

To correct the color fully, the maximum unilateral color amounting to 0.00204 is divided between the two wedges so that each corrects 0.00102. Data for such a wedge are given in Table 3. The glasses differ extremely in dispersion and are well suited to the purpose. The two wedge angles $A_x$ are unequal because of the slight difference in refractive index.

TABLE 3

|  | EK-99 | Schott SF-12 |
|---|---|---|
| $N_D$ | 1.62220 | 1.64814 |
| $N_F-N_C$ | .00992 | .01920 |
| V | 62.7 | 33.8 |
| $A_x$ | 6.80° | 6.52° |

Computation shows a deviation of less than 0.01° in light of "D" wavelength, and two wedges according to these specifications give almost exactly the specified unilateral color.

To correct the unilateral color exactly at all stages of the zooming, the unilateral color of the prism system is computed for several settings and the requisite angular rotation T of the dispersion wedges determined such that cos T times the maximum dispersion equals the unilateral color to be corrected, and a cam or other means provided for rotating the wedges in the manner so computed. Broadly speaking, the wedges must rotate faster at the two ends of the range than in the middle, and this is conveniently accomplished to a very close approximation by making gears 16 and 17 (Figs. 1 and 2) elliptical.

I prefer, however, to take advantage of the permissible tolerance in unilateral color, which may be taken nominally as 0.05 mm. at the focal plane, and to make the rotation of the dispersion wedges linear with respect to that of the main prisms. With a 100 mm. lens, 0.05 mm. at the focal plane amounts to an angle of 0.0005 radian, substantially a fourth of the unilateral color which is to be corrected.

The unilateral color has not been computed for intermediate settings of this particular zoom prism system, but if it is assumed for example that the unilateral color changes linearly with respect to the rotation of the main prisms, then by rotating the above-specified wedges 136° instead of 180° the unilateral color of the zoom prism system is matched within ±.00008 radian at all stages of zooming. Compared with a tolerance of .0005, this leaves room for considerable non-linearity instead of the linearity which was assumed, and so most practical examples are easily matched within tolerances in this way.

*Theory of unilateral color*

The above description is complete and sufficient to enable anyone skilled in the art to practice the invention. However, for those interested in a mathematical analysis of the principles involved, the following exposition of the theory of unilateral color is appended. The theory is developed for a two-prism anamorphoser. In the case of systems made up of two or more such anamorphosers of total unilateral color will be found by combining the vectors representing the unilateral color of each anamorphoser. For example, a four-prism zoom telescope, such as shown in Figs. 7 and 8, made up of two identical anamorphosers has $\sqrt{2}$ times as much unilateral color as one of the two anamorphosers. By "identical" is meant identical with respect to slope angles and glass used but not necessarily with respect to size.

Fig. 9 shows in diagrammatic axial section two refracting prisms 61, 62 traversed by a ray of light which strikes the first surface along path 90 and emerges from the fourth surface along path 90' which may or may not coincide with the axis. The angles of incidence are $I_1$, $I_2$, $I_3$, and $I_4$ and the angles of emergence $I_1'$, $I_2'$, $I_3'$, and $I_4'$ at the respective surfaces from left to right. The refractive angles or vertex angles of the respective prisms are $A_I$ and $A_{II}$. Angles $I_1$, $I_1'$, $I_2$, $I_2'$ and $A_{II}$ are negative according to the adopted sign convention, as indicated by the minus signs in Fig. 9. The refractive index of the first prism for a median color, such as the D spectral line, is $N_I$ and that of the second prism $N_{II}$.

The following Equations 1 to 5 are from standard textbooks or are explained in the above-mentioned copending application:

$$A_I = I_1' - I_2; \quad A_{II} = I_3' - I_4 \quad \text{(Eq. 1)}$$

$$\tan I_1' - \tan I_2 = \frac{\sin A}{\cos I_1' \cos I_2} \quad \text{(Eq. 2)}$$

$$N_I = \frac{\sin I_1}{\sin I_1'} = \frac{\sin I_2'}{\sin I_2}; \quad N_{II} = \frac{\sin I_3}{\sin I_3'} = \frac{\sin I_4'}{\sin I_4} \quad \text{(Eq. 3)}$$

$$M_n = \frac{\cos I_n}{\cos I_n'} \quad \text{(Eq. 4)}$$

where $n$ is 1, 2, 3 or 4 in the two prism system.

$$M_I = M_1 M_2; \quad M_{II} = M_3 M_4; \quad M = M_I M_{II} \quad \text{(Eq. 5)}$$

In addition, Equations 6, 7 and 8 are derived here for future reference: Squaring Eq. 3 and using Eq. 4 for substituting therein:

$$N_I^2 = \frac{1 - \cos^2 I_1}{1 - \cos^2 I_1'} = \frac{1 - M_1^2 \cos^2 I_1'}{1 - \cos^2 I_1'} = \frac{1 - (\cos^2 I_2/M_2^2)}{1 - \cos^2 I_2}$$

From which $$\cos^2 I_1' = \frac{1 - N_I^2}{M_1^2 - N_I^2} \text{ and } \cos^2 I_2 = \frac{1 - N_I^2}{\frac{1}{M_2^2} - N_I^2} \quad \text{(Eq. 6)}$$

Similarly $$M_1^2 = \frac{1 - N_I^2 \sin^2 I_1'}{1 - \sin^2 I_1'} \text{ and } M_2^2 = \frac{1 - \sin^2 I_2}{1 - N_I^2 \sin^2 I_2}$$

From which $$\sin^2 I_1' = \frac{1 - M_1^2}{N_I^2 - M_1^2} \text{ and } \sin^2 I_2 = \frac{1 - M_2^2}{1 - M_2^2 N_I^2} \quad \text{(Eq. 7)}$$

Dividing Eq. 7 by Eq. 6:

$$\tan^2 I_1' = \frac{1 - M_1^2}{N_I^2 - 1} \text{ and } \tan^2 I_2 = \frac{M_2^2 - 1}{M_2^2(N_I^2 - 1)} \quad \text{(Eq. 8)}$$

And likewise for the second prism.

In the present specification the magnification produced by any surface, prism or group of prisms is greater than unity if the image is larger than the object and less than unity if smaller. The light may always be considered as passing from left to right without loss of generality in the mathematical formulas derived below.

The above equations hold for light of a median color such as the "D" spectral line. A ray of light of somewhat different color, for which the refractive indices are $(N_I + dN_I)$ and $(N_{II} + dN_{II})$, has angles of incidence $(I_n + dI_n)$ and angles of emergence $(I_n' + dI_n')$ at the respective surfaces. A measure of the unilateral color of the first prism is $dI_2'$ and of the two-prism system, $dI_4'$. These values will now be derived in terms of the basic Equations 1 to 8 given above.

$$dI_1 = 0$$

Differentiating $\sin I_1' = N_I^{-1} \sin I_1$ we have:

$$d \sin I_1' = -N_I^{-2} \sin I_1 dN_I$$

$$= \frac{\sin I_1'}{N_I} dN_I$$

$$dI_1' = \frac{d \sin I_1'}{\cos I_1'} = -\frac{\tan I_1'}{N_I} dN_I$$

Differentiating Eq. 1 and noting that A is a constant:

$$dI_2 = dI_1'$$

$$d \sin I_2 = -\frac{\tan I_1' \cos I_2}{N_I} dN_I$$

Differentiating $\sin I_2' = N_I \sin I_2$ we have:

$$d \sin I_2' = N_I d \sin I_2 \sin I_2 dN_I$$

$$= \left(-\tan I_1' \cos I_2 \frac{\sin I_2'}{N}\right) dN_I$$

This equation can be put into a form which is more convenient for some purposes. Referring to Eqs. 3, 4 and 1 for substitutions:

$$\tan I_2' = \frac{\sin I_2'}{\cos I_2'} = N_I \sin I_2 \frac{M_2}{\cos I_2} = N_1 M_2 \tan I_2$$

then:

$$dI_2' = -M_2 (\tan I_1' - \tan I_2) dN_I \quad \text{(Eq. 9a)}$$

$$= \frac{-M_2 \sin A_I}{\cos I_1' \cos I_2} dN_I \quad \text{(Eq. 9b)}$$

When ray 90 coincides with the axis 10, this gives the unilateral color of one prism. Taking square roots of Eq. 6 and Eq. 8 and substituting into Eq. 9a and Eq. 9b gives:

$$dI_2' = \sqrt{\frac{M_2^2 - 1 - M_2^2 - M_I^2}{N_I^2 - 1}} dN_I \quad \text{(Eq. 9c)}$$

and $$dI_2' = \sqrt{\frac{\sin A_I (N_I^2 - M_I^2)(M_I^2 N_I^2 - M_1^2)}{M_1(N_I^2 - 1)}} dN_I \quad \text{(Eq. 9d)}$$

The derivation for the second prism follows the same course except that it starts with $$dI_3 = dI_2'$$

rather than zero as in the first prism. It is convenient to carry along the symbol $dI_3$ (or $dI_2'$) and not to substitute a longer expression from Eq. 9 until the end. In this way it is found that:

$$dI_4' = \frac{M_4 \sin A_{II}}{\cos I_3' \cos I_4} dN_{II} + M_{II} dI_2' \quad \text{(Eq. 10)}$$

or, briefly, $$dI_4' = dI_{II}' + M_{II} dI_I' \quad \text{(Eq. 11)}$$

where $dI_{II}'$ is the deviation in the final ray due to the increment $dN_{II}$ of the index of the second prism and $dI_I'$ is the deviation in the ray emergent from the first prism due to the increment $dN_I$ of the first prism. When ray 90 coincides with the axis, this gives the unilateral color of a two-prism anamorphoser.

This can be extended to anamorphosers of more than two prisms in the same plane in an obvious manner, the deviation of a ray leaving any prism being the sum of the deviation due to that prism plus the magnification of that prism times the net deviation of the ray incident upon that prism due to all preceding prisms.

The conventional $dN$ in optical computing is $(N_F - N_C)$ that is the difference in index for the "F" and the "C" lines of the solar spectrum. This differential is of the order of magnitude of 1% of the refractive index. The second order differentials which are neglected in the above equations would then be expected to be on the order of 1% of the first order differential, and this has been found to be roughly the case in typical examples. The accuracy of the above values of $dI'$ is thus about $\pm 1\%$.

*Systems comprising unachromatized prisms*

On the basis of the mathematical theory developed above, the unilateral color of some typical prism-anamorphoser systems has been computed and some optimal systems laid out.

It is to be noted that, as mentioned above and as discussed in the earlier application, two prism anamorphosers at 90° orientation make up a prism telescope and that the unilateral color of the telescope is $\sqrt{2}$ times that of one anamorphoser alone and is at the 45° orientation.

*Balancing the color of two prisms.*—From Eqs. 6 or 7 it is readily seen that

IF $dI_{II}' = dI_I'$ then $$dI_4' = (M_{II} - 1) dI_I'$$

By way of example, this condition is met, in a system made up of two identical prisms, by the ray which traverses the two prisms symmetrically, that is the ray for which $I_1 = -I_3$ and $I_2' = -I_4'$. This is also the ray which emerges in a direction parallel to its incident direction and thus defines the axis. Systems in which the axis of the concomitant lens system coincides with the axis of the prism system are called "straight vision" systems, as mentioned above.

In fixed magnification systems, it is clear that the unilateral color can be corrected by choosing the prism constants (A, N, the dispersive index V and the angular positions of the prisms) so that, for the ray along the axis, $dI_{II}' = -M_{II} dI_I'$. The simplest case in which these conditions are met is a slight modification of the symmetrical case described above, in which $A_{II} = -A_I$, $N_{II} = N_I$, $I_3 = -I_1$ and $I_4' = -I_2'$ but in which $V_I = M_{II} V_{II}$. Pairs of commercially available glasses can be found in which the refractive indices are substantially equal and the ratio of dispersions is as high as 1.7. This is more than ample for any fixed magnification anamorphosers or prism telescopes which are likely to be found useful in photography and which are made of unachromatized prisms. Such a system can be reversed and will be corrected for unilateral color in the reversed position also, but will not remain corrected if zoomed by rotating the prisms on axes parallel to their refracting edges, as described above and in my earlier application.

In the zoom systems shown in my earlier application and in Figs. 2 and 3, each prism is initially in a first position in which its magnification is $M_{max}$ of the order of 1.2 to 1.8 and is rotated to a second position in which its magnification is $M_{min}$ of the order of $1/M_{max}$. For simplicity in the following mathematical derivation $M_{min}$ will be assumed to be exactly equal to $1/M_{max}$.

With this assumption, the unilateral color of the first prism in the second position is $1/M_{max}$ times that in the first position, as may be verified by substituting the appropriate values in any of Eq. 9a to 9d. The magnification of the second prism is also $1/M_{max}$. Thus, letting $dI_I$ and $dI_{II}$ denote the unilateral color of the respective prisms in the first position, the unilateral color of a two-prism anamorphoser in the second position is $$M_{min}(M_{min}dI_I) - M_{min}dI_{II} = \frac{dI_I}{M_{max}^2} - \frac{dI_{II}}{M_{max}}$$

The best compromise in unilateral color may be assumed to be that for which this aberration reaches equal extreme values (but of opposite sign) at the two ends of the zooming range, that is $$M_{max}dI_I - dI_{II} = \frac{dI_{II}}{M_{max}} - \frac{dI_I}{M_{max}^2}$$

This leads to the following ratio of dispersive indices:

$$\frac{V_I}{V_{II}} = \frac{dI_{II}}{dI_I} = \frac{M_{max}^2 + \frac{1}{M_{max}}}{M_{max} + 1} \quad \text{(Eq. 12)}$$

Using these values of V the extreme values of unilateral color are $$\frac{M-1}{M}dI_I$$

The following table gives a series of values of $M_{max}$ and, in the second and third lines, the corresponding values of $dI_4'$ (Max) and $dI_4'$ (Min) which denote the unilateral color of a two-prism zoom anamorphoser when adjusted respectively to the maximum magnification $M_{max}$ and to the other extreme $1/M_{max}$. These are given for typical systems of reasonable length with both prisms made of the same low-dispersion glass. The fourth line gives the optimum value of $V_I/V_{II}$ according to Eq. 12 above. The next two lines give, by way of example, reasonable values of $V_I$ and $V_{II}$ which can be approximated by commercial glasses, and the last line gives the resulting extreme values of the unilateral color for comparison with the second and third lines.

| $M_{max}$ | 1.2 | 1.3 | 1.4 | 1.5 | 1.6 |
|---|---|---|---|---|---|
| $dI_4'$ (Max) | −.0010 | −.0013 | −.0020 | −.0030 | −.0045 |
| $dI_4'$ (Min) | +.0007 | +.0008 | +.0010 | +.0013 | +.0018 |
| $V_I/V_{II}$ | 1.033 | 1.069 | 1.114 | 1.167 | 1.225 |
| $V_I$ (e. g.) | 67.0 | 70.0 | 67.0 | 67.0 | 60.3 |
| $V_{II}$ (e. g.) | 64.8 | 65.5 | 60.0 | 56.4 | 49.2 |
| New $dI_4'$ | ±.0008 | ±.0010 | ±.0014 | ±.0020 | ±.0028 |

These ratios of the X-values are an approximate guide and give a good first approximation in any case, but in some cases it is desirable to compute the unilateral color at the two extremes of magnification and make a closer approximation. For example, the most readily available glasses for the two prisms may have unequal refractive indices or the zooming range may be chosen so that $M_{min} < 1/M_{max}$ in order to make the best use of the available space.

To applicant's knowledge, this is the first time that it has been discovered that the dispersive indices should differ in the two prisms in anamorphosers (and telescopes composed thereof) which are varied in this manner from $M_{max}$ to approximately $1/M_{max}$ per prism.

It is to be noted that the prism in each anamorphoser which is nearer to the dispersion wedges is to have the larger dispersion (smaller V-number) in each case. That is the rear prism in Fig. 6 and prisms 71 and 81 in Figs. 7 and 8. Moreover, in the form of the invention in which this choice of glasses corrects the color sufficiently and so no dispersion wedges are used, the prism nearer the objective has the larger dispersion.

*Effect of changing refracting angle A.*—Fig. 10 shows a prism 101 and a portion of another prism 102 corresponding to prisms 61, 62 of Fig. 9 but with smaller refracting angles A. By tilting them more obliquely, as shown, the magnification can be made equal to that of Fig. 9. The prisms must be made longer and larger, however, to pass the required cone of light which expands forwardly from the pupil of the objective (see Fig. 11), an undesirable feature. In fact, there comes a point at which a specified cone of light will not be passed at all no matter how large the prisms.

To investigate the effect upon the unilateral color of decreasing the prism angle and increasing the obliquity we refer to Eq. 9c in which the unilateral color $dI_2'$ is expressed in terms of $N_I$, $M_2$ and $M_I$. The more oblique the prism the larger $M_2$ becomes ($M_1$, which does not appear in this equation, varies inversely.) Thus $M_2$ is a measure of the obliquity and hence of the length of the system. The derivative of $dI_2'$ with respect to $M_2$ is found by standard methods to be:

$$\frac{d}{dM_2}(dI_2') = \frac{M_2 dN_I}{\sqrt{N_I^2-1}}\left(\frac{1}{\sqrt{M_2^2-1}} - \frac{1}{\sqrt{M_2^2-M_I^2}}\right) \quad \text{(Eq. 13)}$$

Since, as pointed out in my earlier application, the magnification $M_1$ when a ray enters a prism is always 1 or less and $M_2$ when the ray leaves the prism is always 1 or greater, it follows that neither $M_1$ nor $M_2$ can be between 1 and $M_I$. Limiting our attention for the moment to the case shown in Fig. 9 in which $M_I = M_{max} > 1$, it may be seen that the derivative $$\frac{d}{dM_2}(dI_2')$$

is always negative and that $M_2^2 - M_I^2$ is zero when $M_1 = 1$ and $M_2 = M_I$, and hence at this point the derivative is infinite. This is at the position of normal incidence upon the front surface. The meaning of this surprising result is easily understood by considering that as the angle $A_I$ of a prism is varied during design while maintaining $M_I$ and as $I_1$ changes infinitesimally from $-dI_1$ to $+dI_1$ the respective magnifications $M_1$ and $M_2$ do not change, but the unilateral color as given by Eq. 9d does change. From Eq. 9d or from the negative value of Eq. 13, it is seen that the unilateral color gets smaller as $A_I$ is decreased and $M_2$ increased.

Somewhere between the point at which the unilateral color improves at an infinite rate and the point at which the required size of the prism increases at an infinite rate, there is an optimum value of $M_2$. And likewise, if $A_I$ is decreased by increasing $N_I$ while maintaining the same length of system or prism size, according to some practical criterion, there is an optimum value of $N_I$, which will now be determined at least roughly.

*Choosing the glass.*—It is clear that for a given index N the lowest available dispersions of $dI_I$ and $dI_{II}$ in the ratio defined above will give the lowest extreme values of unilateral color. Increasing N tends to decrease the angle A, however, and from Eq. 9b it would be expected that with a smaller angle A a larger dispersion $dN$ can be tolerated. As is well known, the dispersion tends to increase with N among known glasses, and so the question arises as to whether choosing a glass with a higher refractive index and higher dispersion would improve or worsen the unilateral color.

As a first step in finding the best balance between these two desiderata, consider the simplest case, namely a family of systems in which $M_2$ and $M_I$ are held constant and $N_I$ is varied. In this case the numerator in Eq. 9c remains constant but the denominator becomes larger as $N_I$ is increased, thus decreasing the unilateral color $dI_2'$ relative to $dN_I$. If for comparison purposes we select a series in which the unilateral color of the first prism is held constant by suitably varying $dN_I$ as the index varies, we have $$\frac{dN_I}{\sqrt{N_I^2-1}} = \text{a constant}$$

Substituting the conventional $$\frac{N_I-1}{V_I} \text{ for } dN_I$$

$$V_I = \sqrt{\frac{N_I-1}{N_I+1}} \text{ times a constant}$$

This family of systems lies along the curve 121 in Fig. 12.

Fig. 12 is a graph in which the coordinates are the dispersive index V on a logarithmic scale and the refractive index N on a linear scale in the region of commercially available low-dispersion optical materials. Typical low dispersion glasses are indicated at 125, 126 and 127. These Schott glasses FK–5 and SK–16 and an Eastman Kodak glass EK–99. Fluoride crystals are indicated by triangles 128. The curves 121 to 124 indicate families of prism systems of mutually equal unilateral color. The abscissa is on a logarithmic scale in order that a curve can be "moved" to right or left without changing its shape and will then indicate a related family of systems with a different unilateral color (but constant within the family).

It appears from the shape of curve 121 that a low index glass is far better. This turns out to be misleading, however, because the low-index systems are longer and if the high-index systems are made up in a comparable length they will compare more favorably with the low-index systems than is indicated by curve 121.

As a second step, in determining the optimum index, a series of prisms was computed in which $I_1$ is 0° for an index of 1.5 and $I_2'$ is maintained the same in all the prisms of the series. The values used are $M_I = 1.6$ and $I_2' = -59.173°$. In this series, prisms having equal values of unilateral color lie along the curve 122 in Fig. 12. In this case the EK–99 glass 127 is the best commercial glass.

However, when scale drawings were made of these systems it was found that, contrary to the series given by curve 121, the high index systems were longer than the low index systems and that a family of systems of mutually equal length would lie about half-way between but slightly closer to the second series, with respect to $M_2$.

Accordingly, as a third step in finding an optimum index $N_I$, values of $M_2$ were estimated and values of $V_I$ computed by Eq. 9c for a series of indices $N_I$ as follows:

| $N_I$ | $M_2$ | $V_I$ | ($M_2$ of second step for comparison) |
|---|---|---|---|
| 1.50 | 1.600 | 74.6 | (1.600) |
| 1.55 | 1.615 | 66.2 | (1.625) |
| 1.60 | 1.628 | 63.3 | (1.647) |
| 1.65 | 1.639 | 62.4 | (1.666) |
| 1.70 | 1.655 | 60.9 | (1.684) |

These lie along the curve 123 in Fig. 12. Here again EK–99 is the best commercial glass. The unilateral color is about 0.26° or 0.0045 radians in a two-prism anamorphoser made up of this glass and 1.4 times this or 0.0063 radians in a four-prism telescope system. Accordingly, assuming a tolerance of 0.05 mm. at the focal plane, this system must be further corrected, for example by dispersion wedges according to the invention, if used as an anamorphoser with lenses of over 11 mm. focal length. (This can be improved upon by using unequal dispersions as above described.)

As a further example, another family of systems was computed in which the magnification per prism is 1.4. As a preliminary step, $M_2$ was computed for $I_2' = 54.5°$ and for different indices N, then the final value of $M_2$ was estimated between the preliminary values and 1.40. In this family of systems, values of V giving the same unilateral color lie along the curve 124, Fig. 12, or along the same curve displaced to right or left. For this family the best commercial glass appears to be the Schott glass FK5 (1.487/70), which gives $\Delta I_4' = -.0019$ radians. Thus a two-prism anamorphoser system could be used with a 26 mm. objective if we assume as before a tolerance of 0.05 mm. at the focal plane, or a four-prism telescope attachment could be used with an 18 mm. objective.

Fig. 11 shows in long dashes the outline of a two-prism anamorphoser 111, 112 in which N=1.45 and in short dashes a system 113, 114 in which N=1.50. Both of these systems are laid out to pass a ±10° cone of light into or from the pupil (defined by arrows 115) of the objective 14 shown in outline. The second system is a tiny bit shorter than the first but has a slightly larger diameter, and so the two systems are considered equivalent in size. It is to be remembered that either system can be made shorter by increasing the apex angles $A_I$ and $A_{II}$ but that the unilateral color becomes worse and furthermore it becomes worse faster for the 1.45 index system than for the higher index system.

It will be noted that the unilateral color was cut to less than half by reducing the magnification per prism from 1.6 to 1.4. Of course, this color aberration can be further decreased by further decreasing the magnification. However, if the conditions of use require larger magnifications than are compatible with tolerable color aberrations then some method of achromatizing is necessary, and the present invention provides a very favorable method. It is useful in fixed magnification anamorphoser or telescope systems and especially useful in variable magnification or zoom systems.

*Design of dispersion wedges according to the invention*

Each dispersion wedge is made up of two elemental glass wedges. The dispersion or unilateral color $dI_x'$ produced by each disk is computed by the formula $$dI_x' = \tan I_c \, (dN_a - dN_b)$$

where $dN_a$ and $dN_b$ are the mean dispersions ($N_F - N_c$) of the first and second wedge respectively of the disk and $I_c$ is the angle of incidence of the axial ray at the cemented surface. In case the two refractive indices are not equal the axis is deviated slightly unless the two wedge angles are made unequal by an amount approximately equal to tan $$I_c \frac{N_a - N_b}{N - 1}$$

where N is the average of the two refractive indices $N_a$ and $N_b$. The lower index glass is of course given the larger wedge angle.

Ideally, the wedge angles are chosen so as to exactly counteract the unilateral color of the prism magnification system, but for practical reasons the wedge angles are sometimes made smaller but still sufficiently large to bring the final color aberration within predetermined acceptable tolerances. Obviously, to have small wedge angles there should be a large difference between the dispersions of the two wedge elements.

*Size of prisms.*—The requisite size of the prisms is conveniently determined by laying out the system as in Fig. 11 with the extreme rays drawn to scale.

In Figs. 7 and 8 described above, the prisms are laid out to pass a 10° cone of light with 50% vignetting to afford a direct comparison with Figs. 21 and 22 of my earlier case. It may be noted that this system with a 3.96 zooming range has about the same length and size as the earlier system having a 3.0 zooming range. However, I now prefer to make the prisms slightly larger so as to have considerably less vignetting and to grind off the corners of the exit face of prism 72 and the entrance face of prism 81 and bring the front anamorphoser back closer to the rear anamorphoser until prisms 72 and 81 would actually overlap in Figs. 7 and 8.

I claim:

1. A prismatic zoom optical system comprising an objective, a plurality of individually unachromatized refracting prisms in front of the objective with their active planes optically aligned with the objective and oriented at substantially equal angles around the axis of the objective, means for rotating each of said prisms in its active plane for zooming and all of them simultaneously at relative angular rates of rotation such that the total angular deviation of the optical axis is maintained less than a predetermined tolerance, two color dispersion wedges also optically aligned in front of the objective and substantially perpendicular to the optic axis and means for rotating said wedges in opposite directions in planes transverse to the optic axis, and means coupling all said rotating means to maintain the resultant direction and amount of color dispersion of the two wedges opposite and approximately equal to the direction and amount of the residual color dispersion of the zooming prisms, the residual color dispersion of the zooming prisms being greater than a predetermined tolerance at each end of the zooming range and each color dispersion wedge being made up of two elemental glass wedges cemented together and having equal and opposite deviation for a median wavelength of visible light and unequal dispersive powers such that the numerical sum of the dispersions of the two color dispersion wedges is approximately equal to the maximum color dispersion of the zooming prisms.

2. A system according to claim 1 including a collimating lens aligned in front of the wedge and prism system for receiving light from an object and for directing approximately collimated light through the wedges and prisms to the objective, in which the rear lens element of the collimating lens is cemented onto the front color dispersion wedge.

3. For use with an optical system of variable unilateral color, a pair of color dispersion wedges parallel to each other and transverse to an optic axis, each wedge comprising two wedge elements cemented together and having equal and opposite deviation for one wavelength of visible light and having different dispersive powers and means for simultaneously rotating the wedges equal amounts in opposite directions in planes transverse to the optic axis, whereby the deviation of the axial ray in a median wavelength of visible light is zero and the color dispersion is variable from a maximum in one direction to an equal maximum in the opposite direction.

References Cited in the file of this patent

UNITED STATES PATENTS

| | | |
|---|---|---|
| 818,553 | Phillips | Apr. 24, 1906 |
| 1,647,631 | Ives | Nov. 1, 1927 |
| 1,680,534 | Garbutt | Aug. 14, 1928 |
| 1,735,108 | Cox | Nov. 12, 1929 |
| 1,758,801 | Moses | May 13, 1930 |
| 1,898,787 | Newcomer | Feb. 21, 1933 |
| 1,905,442 | Coors | Apr. 25, 1933 |
| 1,931,992 | Newcomer | Oct. 24, 1933 |
| 1,932,082 | Newcomer | Oct. 24, 1933 |
| 2,023,217 | Benford | Dec. 3, 1935 |
| 2,048,284 | Newcomer | July 21, 1936 |
| 2,375,634 | Dunning | May 8, 1945 |

FOREIGN PATENTS

| | | |
|---|---|---|
| 338,962 | Great Britain | Dec. 1, 1930 |